United States Patent
Shen et al.

(10) Patent No.: US 9,779,022 B2
(45) Date of Patent: Oct. 3, 2017

(54) METHODS FOR CACHING AND READING DATA TO BE PROGRAMMED INTO A STORAGE UNIT AND APPARATUSES USING THE SAME

(71) Applicant: Silicon Motion, Inc., Jhubei (TW)

(72) Inventors: Yang-Chih Shen, Taipei (TW); Che-Wei Hsu, Taichung (TW)

(73) Assignee: Silicon Motion, Inc., Jhubei (TW)

(*) Notice: Subject to any disclaimer, the term of this patent is extended or adjusted under 35 U.S.C. 154(b) by 98 days.

(21) Appl. No.: 14/738,464

(22) Filed: Jun. 12, 2015

(65) Prior Publication Data

US 2016/0132432 A1 May 12, 2016

(30) Foreign Application Priority Data

Nov. 6, 2014 (TW) .............................. 103138488 A

(51) Int. Cl.
*G06F 12/08* (2016.01)
*G06F 12/0873* (2016.01)

(52) U.S. Cl.
CPC .. *G06F 12/0873* (2013.01); *G06F 2212/1021* (2013.01); *G06F 2212/313* (2013.01); *G06F 2212/608* (2013.01)

(58) Field of Classification Search
CPC ......... G06F 12/0873; G06F 2212/1021; G06F 2212/313; G06F 2212/608
See application file for complete search history.

(56) References Cited

U.S. PATENT DOCUMENTS

| 8,281,074 B2 | 10/2012 | Jeddeloh |
| 2015/0106556 A1* | 4/2015 | Yu ......................... G11C 16/349 711/103 |
| 2015/0261443 A1* | 9/2015 | Wei ......................... G06F 3/065 711/162 |

FOREIGN PATENT DOCUMENTS

| JP | 4498426 B2 | 7/2010 |
| KR | 10-0823171 B1 | 4/2008 |
| TW | 201011760 A | 3/2010 |
| TW | I326028 | 6/2010 |
| TW | I338856 | 3/2011 |
| TW | 201113886 A | 4/2011 |
| TW | I353518 | 12/2011 |
| TW | I381386 | 1/2013 |

(Continued)

OTHER PUBLICATIONS

Office Action dated Jun. 27, 2016 of its corresponding TW patent application.

*Primary Examiner* — Yong Choe
(74) *Attorney, Agent, or Firm* — Wang Law Firm, Inc.

(57) ABSTRACT

A method for caching and reading data to be programmed into a storage unit, performed by a processing unit, including at least the following steps. A write command for programming at least a data page into a first address is received from a master device via an access interface. It is determined whether a block of data to be programmed has been collected, where the block contains a specified number of pages. The data page is stored in a DRAM (Dynamic Random Access Memory) and cache information is updated to indicate that the data page has not been programmed into the storage unit, and to also indicate the location of the DRAM caching the data page when the block of data to be programmed has not been collected.

18 Claims, 6 Drawing Sheets

(56) References Cited

FOREIGN PATENT DOCUMENTS

TW         I386802     2/2013
TW    201314452 A   4/2013

\* cited by examiner

METHODS FOR CACHING AND READING DATA TO BE PROGRAMMED INTO A STORAGE UNIT AND APPARATUSES USING THE SAME

CROSS REFERENCE TO RELATED APPLICATIONS

This Application claims priority to Taiwan Patent Application No. 103138488, filed on Nov. 6, 2014, the entirety of which is incorporated by reference herein.

BACKGROUND

Technical Field

The present invention relates to flash memory, and in particular to methods for caching and reading data to be programmed into a storage unit and apparatuses using the same.

Description of the Related Art

Flash memory devices typically include NOR flash devices and NAND flash devices. NOR flash devices are random access—a host accessing a NOR flash device can provide the device any address on its address pins and immediately retrieve data stored in that address on the device's data pins. NAND flash devices, on the other hand, are not random access but serial access. It is not possible for NOR to access any random address in the way described above. Instead, the host has to write into the device a sequence of bytes which identifies both the type of command requested (e.g. read, write, erase, etc.) and the address to be used for that command. The address identifies a page (the smallest chunk of flash memory that can be written in a single operation) or a block (the smallest chunk of flash memory that can be erased in a single operation), and not a single byte or word. In reality, the NAND flash device always reads from the memory cells and writes to the memory cells complete pages. After a page of data is read from the array into a buffer inside the device, the host can access the data bytes or words one by one by serially clocking them out using a strobe signal. Improving the data access efficiency of the NAND flash device is always the focus. Accordingly, what is needed are methods for caching and reading data to be programmed into a storage unit and apparatuses that use these methods.

BRIEF SUMMARY

An embodiment of the invention introduces a method for caching and reading data to be programmed into a storage unit, performed by a processing unit, including at least the following steps. A write command for programming at least a data page into a first address is received from a master device via an access interface. It is determined whether a block of data to be programmed has been collected, where the block contains a specified number of pages. The data page is stored in a DRAM (Dynamic Random Access Memory) and cache information is updated to indicate that the data page has not been programmed into the storage unit, and to also indicate the location of the DRAM caching the data page when the block of data to be programmed has not been collected.

An embodiment of the invention introduces an apparatus for caching and reading data to be programmed into a storage unit, including at least an access interface and a processing unit. The processing unit, coupled to the access interface, receives a write command for programming at least a data page into a first address from the master device via the access interface; determines whether a block of data to be programmed has been collected, wherein the block contains a specified number of pages; and stores the data page in a DRAM and updates cache information to indicate that the data page has not been programmed into the storage unit, and to also indicate the location of the DRAM caching the data page when the block of data to be programmed has not been collected.

A detailed description is given in the following embodiments with reference to the accompanying drawings.

BRIEF DESCRIPTION OF THE DRAWINGS

The present invention can be fully understood by reading the subsequent detailed description and examples with references made to the accompanying drawings, wherein.

DETAILED DESCRIPTION

The following description is of the best-contemplated mode of carrying out the invention. This description is made for the purpose of illustrating the general principles of the invention and should not be taken in a limiting sense. The scope of the invention is best determined by reference to the appended claims.

The present invention will be described with respect to particular embodiments and with reference to certain drawings, but the invention is not limited thereto and is only limited by the claims. It should be understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

Figure 1:
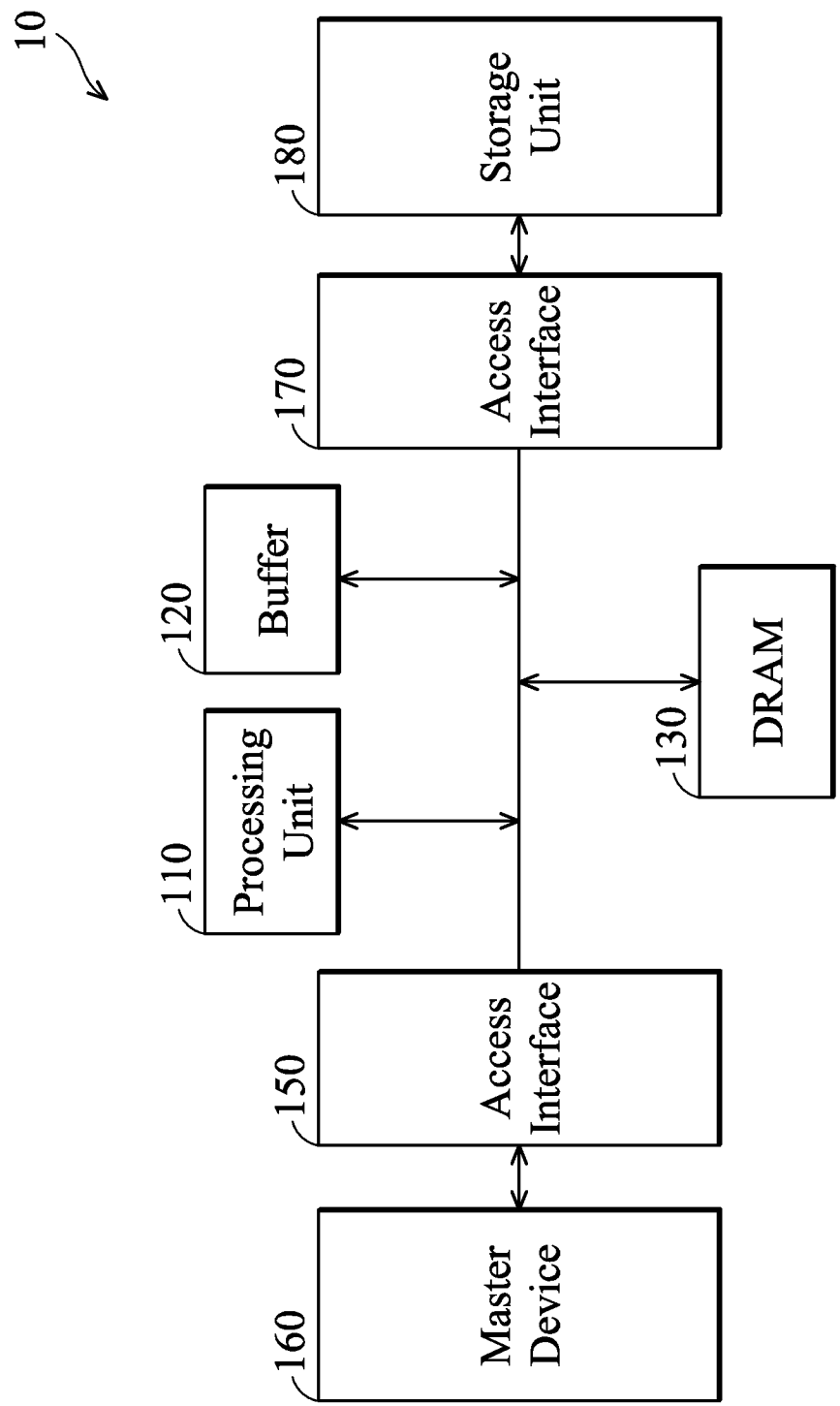
FIG. 1 is the system architecture of a flash memory according to an embodiment of the invention.

FIG. 1 is the system architecture of a flash memory according to an embodiment of the invention. The system architecture 10 of the flash memory contains a processing unit 110 configured to write data into a designated address of a storage unit 180, and read data from a designated address thereof. Specifically, the processing unit 110 writes data into a designated address of the storage unit 180 through an access interface 170 and reads data from a designated address thereof through the same interface 170. The system architecture 10 uses several electrical signals for coordinating commands and transferring data between the processing unit 110 and the storage unit 180, including data lines, a clock signal and control lines. The data lines are employed to transfer commands, addresses and data to be written and read. The control lines are utilized to issue control signals, such as CE (Chip Enable), ALE (Address Latch Enable), CLE (Command Latch Enable), WE (Write Enable), etc. The access interface 170 may communicate with the storage unit 180 using a SDR (Single Data Rate) protocol or a DDR (Double Data Rate) protocol, such as ONFI (open NAND flash interface), DDR toggle, etc. The processing unit 110 may communicate with a master device 160 through an access interface 150 using a standard protocol, such as USB (Universal Serial Bus), ATA (Advanced Technology Attachment), SATA (Serial ATA), PCI-E (Peripheral Component Interconnect Express), etc.

Figure 2:
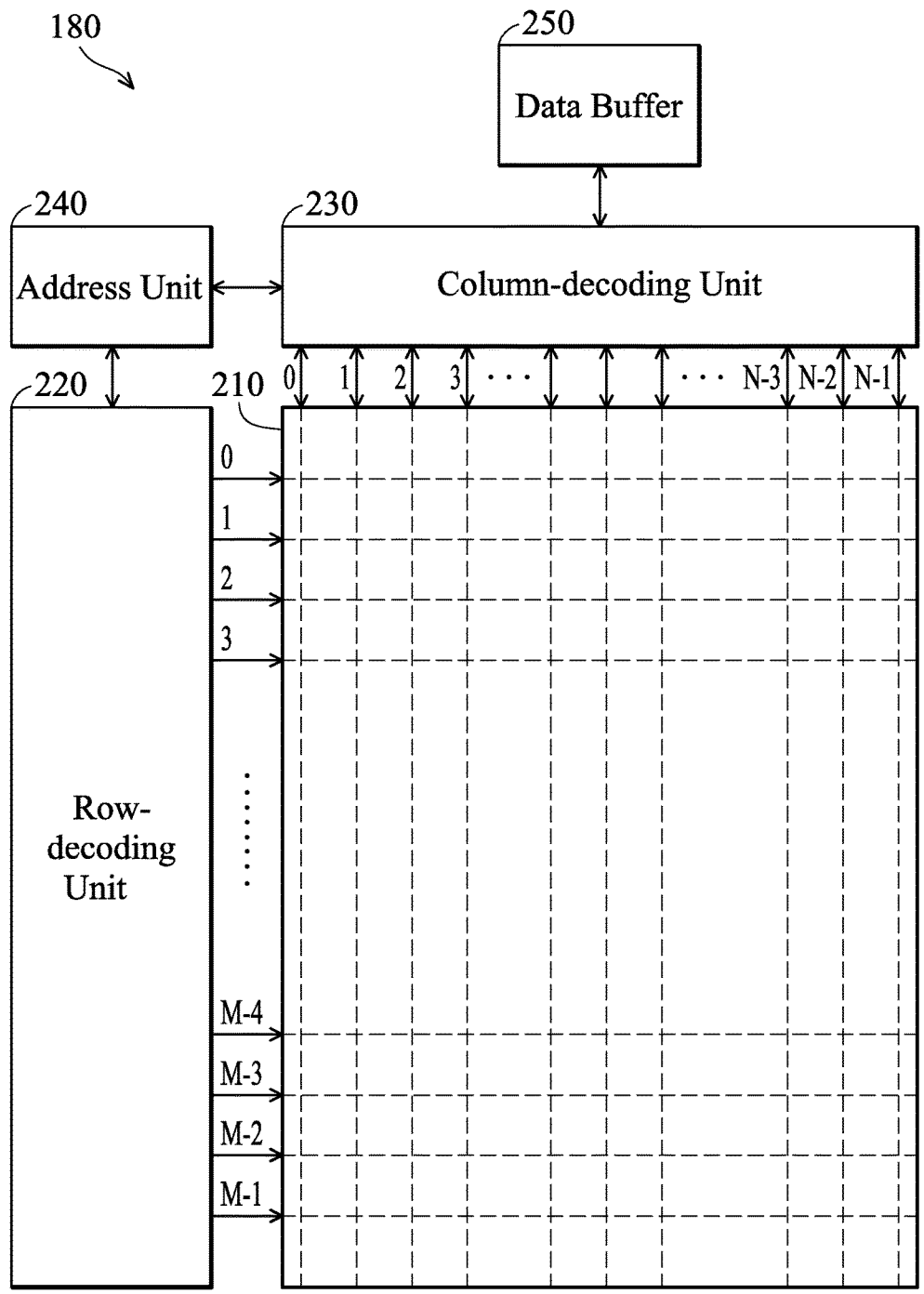
FIG. 2 shows a schematic diagram depicting a storage unit of a flash memory according to an embodiment of the invention.

FIG. 2 shows a schematic diagram depicting a storage unit of a flash memory according to an embodiment of the invention. A storage unit 180 includes an array 210 composed of M×N memory cells, and each memory cell may store at least one bit of information. The flash memory may be a NAND flash memory, etc. In order to appropriately access the desired information, a row-decoding unit 220 is used to select appropriate row lines for access. Similarly, a column-decoding unit 230 is employed to select an appropriate number of bytes within the row for output. An address unit 240 applies row information to the row-decoding unit 220 defining which of the N rows of the memory cell array 210 is to be selected for reading or writing. Similarly, the column-decoding unit 230 receives address information defining which one or ones of the M columns of the memory cell array 210 are to be selected. Rows may be referred to as wordlines by those skilled in the art, and columns may be referred to as bitlines. Data read from or to be applied to the memory cell array 210 is stored in a data buffer 250. Memory cells may be SLCs (Single-Level Cells), MLCs (Multi-Level Cells) or TLCs (Triple-Level Cells).

Figure 3:
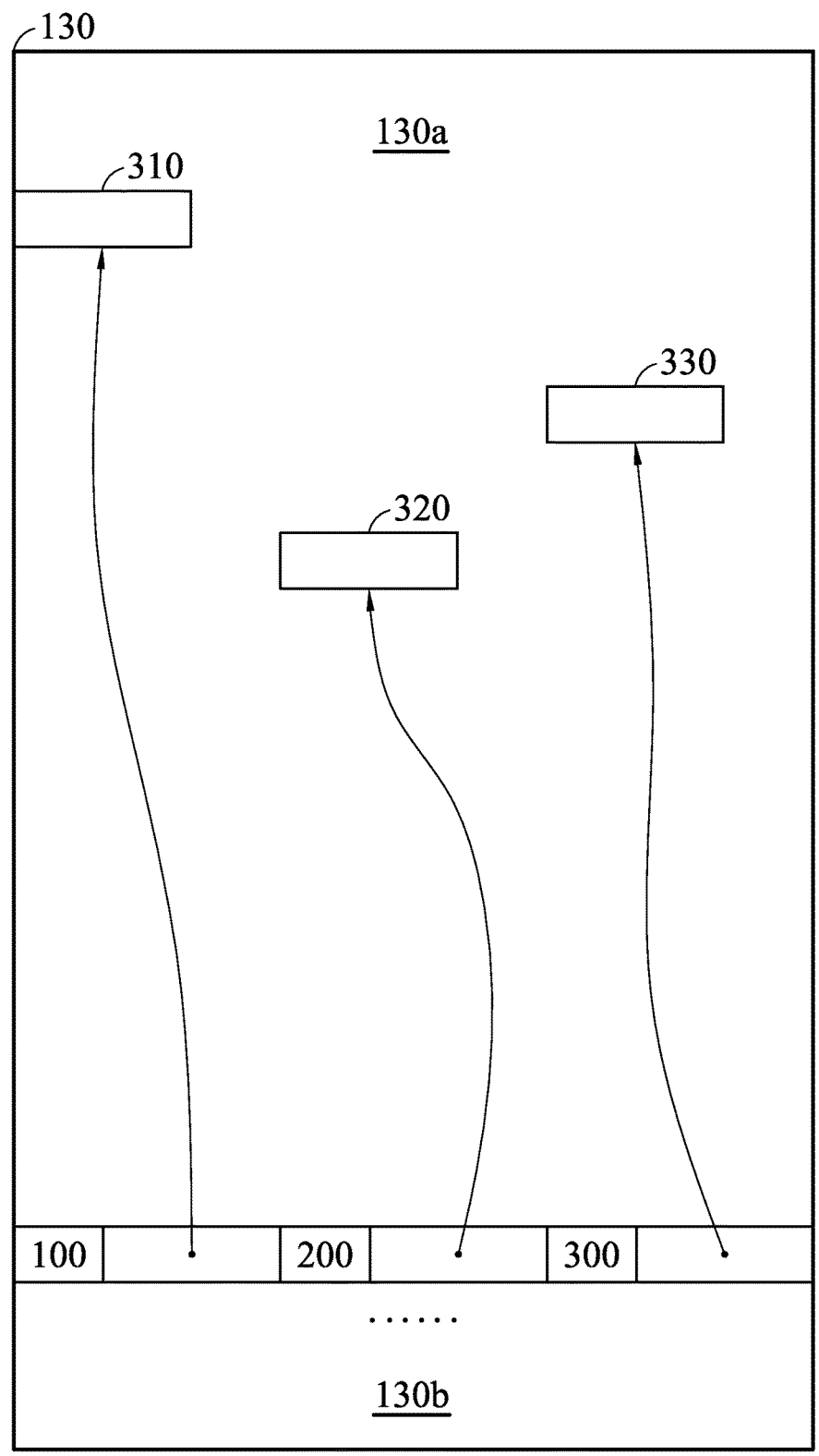
FIG. 3 is a schematic diagram illustrating cache information according to an embodiment of the invention.
Figure 4:
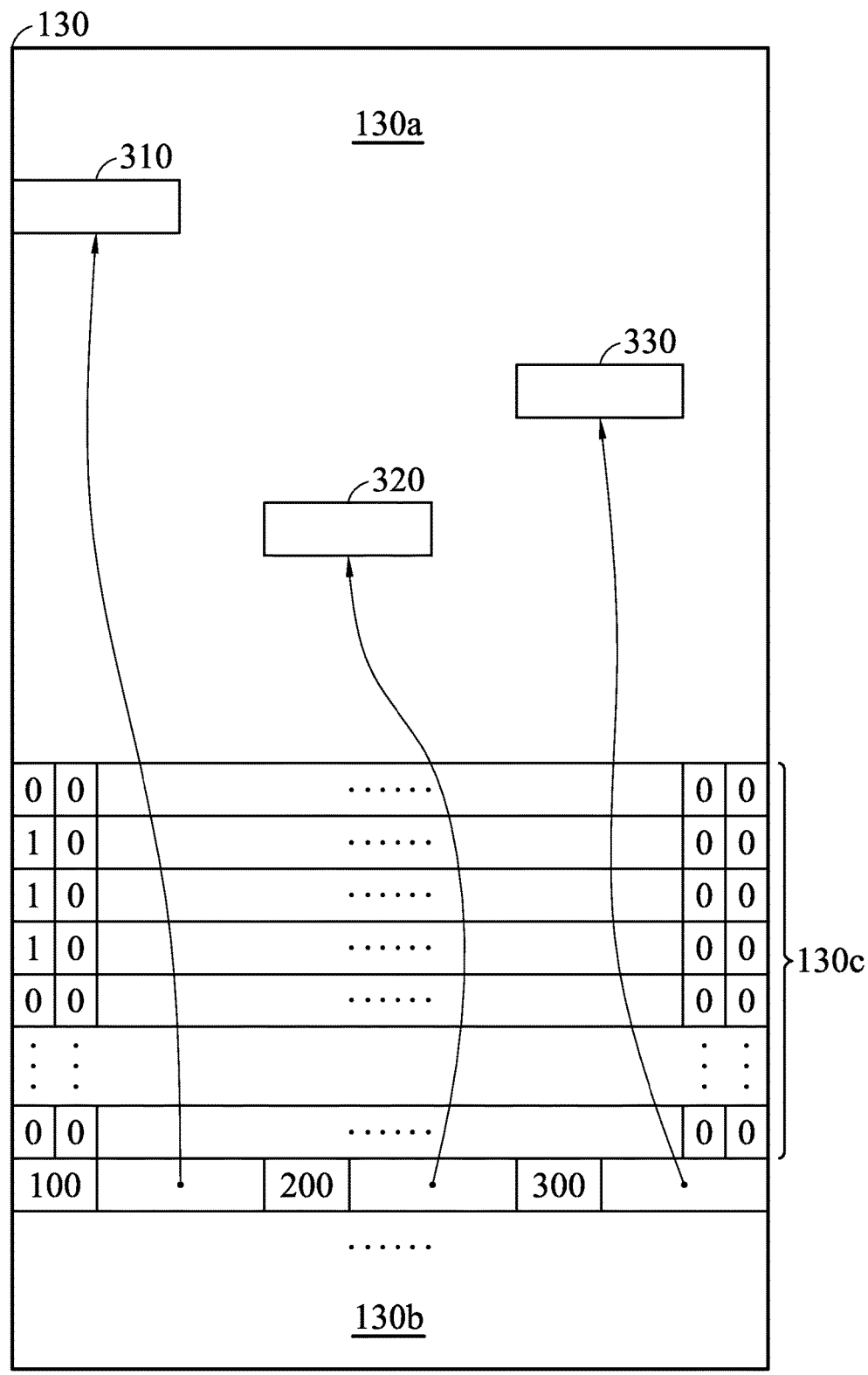
FIG. 4 is a schematic diagram illustrating cache information including a cache bitmap according to an embodiment of the invention.

The master device 160 may direct the access interface 150 to send a write command to instruct the processing unit 110 to write data and one write command may be used to write one page of data. In order to optimize the data programming to the storage unit 180, the processing unit 110 may cache the data to be programmed in a DRAM (Dynamic Random Access Memory) 130 and direct the access interface 170 to program the cached data of the DRAM 130 into the storage unit 180 until one block of data has been collected. Assume that one block contains four pages and each page contains 4K bytes of data: After collecting 16K bytes of data (i.e. four pages), the processing unit 110 directs the access interface 170 to program data into the storage unit 180. It should be noted that the 16K-bytes of data does not necessarily needed to be programmed into the same physical block but into different blocks. However, when the access interface 170 is directed to read data from the storage unit 180 in response to a received read command for reading data which has been cached in the DRAM 130 but not programmed into the storage unit 180, the processing unit 110 obtains data which has not recently been updated. Thus, the processing unit 110 further stores cache information in the DRAM 130, which is used to determine whether data of a specific page has been programmed into the storage unit 180, to avoid the aforementioned problem. The DRAM 130 may allocate two regions: one is used to store data to be programmed into the storage unit 180; and the other is used to store the cache information. In an embodiment, the cache information may be implemented in records and each record stores a write address sent by the master device 160, such as an LBA (Logical Block Address), and an address of the DRAM 130 for caching data to be programmed FIG. 3 is a schematic diagram illustrating cache information according to an embodiment of the invention. The DRAM 130 stores three records associated with LBAs "100", "200" and "300" and the records store their respective pointers to specific addresses 310, 320 and 330 of the region 130a. The processing unit 110 may determine whether data of an LBA requested by a read command has not been programmed into the storage unit 180 by checking the records of the region 130b. For example, after receiving a read command for the LBA "300", the processing unit 110 determines that data of the LBA "300" has not been programmed into the storage unit 180 because the region 130b stores a record associated with the LBA "300", and finds a data page of the LBA "300" through a DRAM address of the corresponding record. After receiving a read command for the LBA "310", the processing unit 110 determines that data of the LBA "310" has been programmed into the storage unit 180 because a record associated with the LBA "310" is not stored in the region 130b. However, the above implementation has to search all records to ensure if data associated with an LBA of a received read command has not been programmed into the storage unit 180. In order to reduce the judgment time, in another embodiment, on top of the aforementioned records, the cache information may further contain a cache bitmap. FIG. 4 is a schematic diagram illustrating cache information including a cache bitmap according to an embodiment of the invention. The DRAM 130 may further allocate a region 130c to store the cache bitmap including bits of the total number of LBAs where each bit indicates whether data of a respective LBA has not been programmed into the storage unit 180 (i.e. is still cached in the DRAM 130). For example, the $100^{th}$ bit indicates whether data of the LBA "100" has not been programmed into the storage unit 180. The value of the $100^{th}$ bit being "1" indicates that data of the LBA "100" has not been programmed into the storage unit 180 while the value of the $100^{th}$ bit being "0" indicates that data of the LBA "100" has been programmed into the storage unit 180. The processing unit 110 has no need to complete the reading of all records of the region 130b but directly reads the value of the $100^{th}$ bit of the cache bitmap to determine that data of LBA "310" has been programmed into the storage unit 180.

Figure 5:
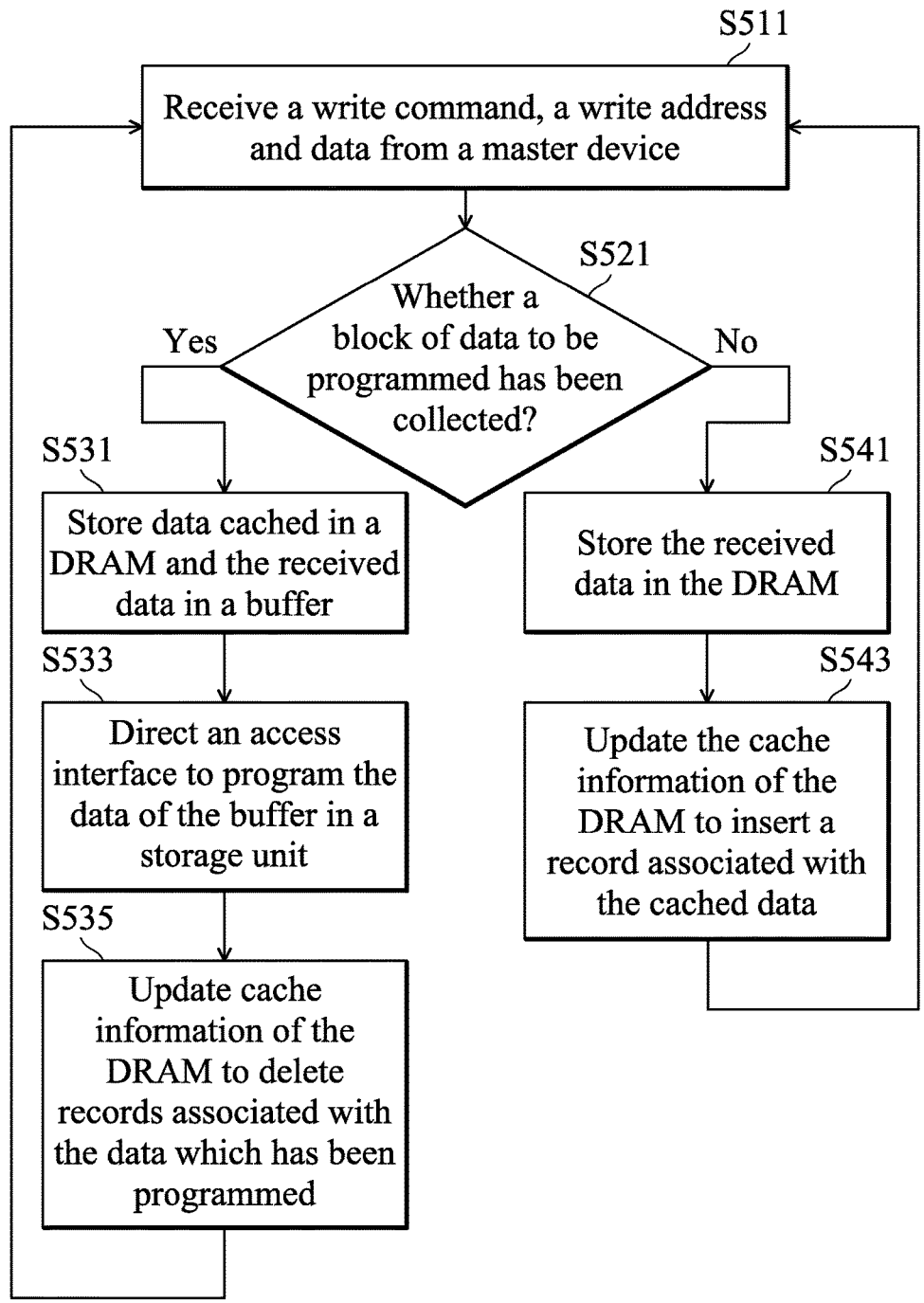
FIG. 5 is a flowchart illustrating a method for programming data, performed by a processing unit, according to an embodiment of the invention.

FIG. 5 is a flowchart illustrating a method for programming data, performed by the processing unit 110, according to an embodiment of the invention. After receiving a write command, a write address and data from the master device 160 via the access interface 150 (step S511), the processing unit 110 determines whether a block of data to be programmed has been collected (step S521). The write address may be an LBA. Assume that one block contains four pages: The processing unit 110 may determine whether a block of data to be programmed has been collected by inspecting if three records are present in the region 130b. If so (the "Yes" path of step S521), the processing unit 110 stores data cached in the DRAM 130 and stores the received data in a buffer 120 (step S531) and directs the access interface 170 to program the data of the buffer 120 in the storage unit 180 (step S533). In step S531, the processing unit 110 may store the cached data of the DRAM 130 in the buffer 120 through a DMA (Dynamic Memory Access) controller (not shown). Next, the processing unit 110 updates the cache information of the DRAM 130 to delete records associated with the data which has been programmed (step S535). Taking FIG. 3 as an example, relevant records of the region 130b are deleted. Or, taking FIG. 4 as an example, relevant records of the region 130b are deleted and relevant bit values of the cache bitmap of the region 130c are set to "0". In other words, cached data of specific LBAs has been programmed into the storage unit 180 if relevant records are absent in the region 130b or relevant bit values of the cache bitmap of the region 130c are set to "0". If not (the "No" path of step S521), the processing unit 110 stores the received data in the DRAM 130 (step S541) and updates the cache information of the DRAM 130 to insert a record associated with the cached data (step S543). Taking FIG. 3 as an example, a record is appended to the region 130b. Or, taking FIG. 4 as an example, a record is appended to the region 130b and a relevant bit value of the cache bitmap of the region 130c is set to "1".

Figure 6:
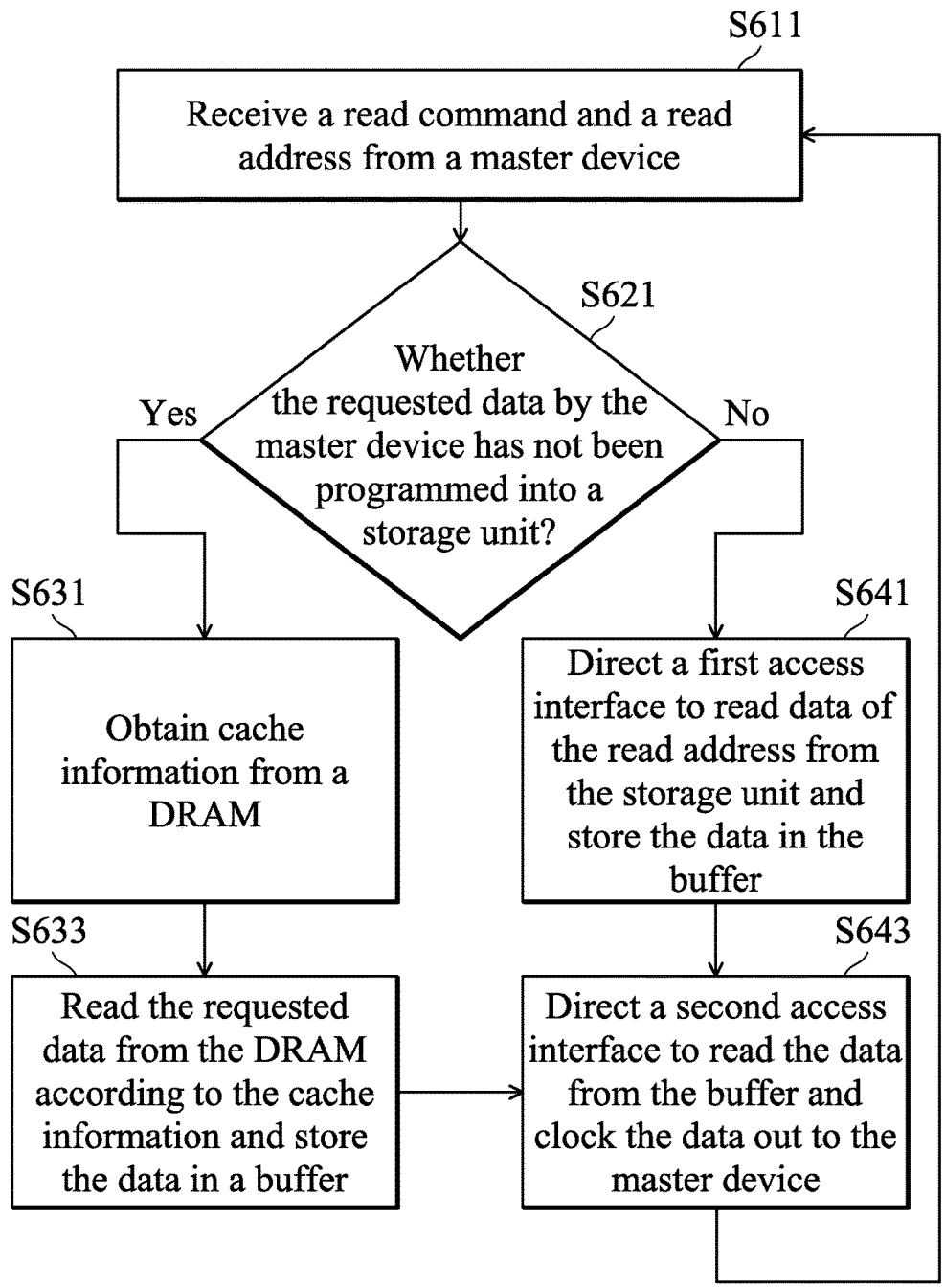
FIG. 6 is a flowchart illustrating a method for reading data, performed by a processing unit, according to an embodiment of the invention.

FIG. 6 is a flowchart illustrating a method for reading data, performed by the processing unit 110, according to an embodiment of the invention. After receiving a read command and a read address from the master device 160 via the access interface 150 (step S611), the processing unit 110 determines whether the data requested by the master device 160 has not been programmed into the storage unit 180 (step S621). The read address may be an LBA. Taking FIG. 3 as an example, the processing unit 110 may perform the determination by inspecting whether a record associated with the read address is present in the region 130b. Taking FIG. 4 as an example, the processing unit 110 may perform the determination by inspecting the bit value of the cache bitmap of the region 130c, which is associated with the read address. If so (the "Yes" path of step S621), the processing unit 110 obtains cache information from the DRAM 130 (step S631), reads the requested data from the DRAM 130 according to the cache information and stores the data in the buffer 120 (step S633) and directs the access interface 150 to read the data from the buffer 120 and clock the data out to the master device 150 (step S643). The content of the cache information of the DRAM 130 and the method for obtaining the requested data according to the cache information are described above, in reference to of FIG. 3 and FIG. 4. In step S633, the processing unit 110 may store the cached data of the DRAM 130 in the buffer 120 through a DMA controller (not shown). If not (the "No" path of step S621), the processing unit 110 directs the access interface 170 to read data of the read address from the storage unit 180 and stores the data in the buffer 120 (step S641) and directs the access interface 150 to read the data from the buffer 120 and clock the data out to the master device 150 (step S643).

Although the embodiment has been described as having specific elements in FIGS. 1 and 2, it should be noted that additional elements may be included to achieve better performance without departing from the spirit of the invention. While the process flows described in FIGS. 5 and 6 each includes a number of operations that appear to occur in a specific order, it should be apparent that these processes can include more or fewer operations, which can be executed serially or in parallel (e.g., using parallel processors or a multi-threading environment).

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method for caching and reading data to be programmed into a storage unit, performed by a processing unit, comprising:
   receiving a write command for programming at least a data page into a first address from a master device via a first access interface;
   determining whether a block of data to be programmed has been collected, wherein the block contains a specified number of pages; and
   storing the data page in a DRAM (Dynamic Random Access Memory) and updating cache information to indicate that the data page has not been programmed into the storage unit, and to also indicate the location of the DRAM caching the data page when the block of data to be programmed has not been collected,
   wherein the step for updating cache information to indicate that the page of data has not been programmed into the storage unit, and to also indicate the location of the DRAM caching the page of data further comprises:
   inserting a record comprising the first address, and a second address of the DRAM caching the data page.

2. The method of claim 1, wherein the step for determining whether a block of data to be programmed has been collected further comprises:
   determining whether a block of data to be programmed has been collected by inspecting if a specified number of records are present in the DRAM.

3. The method of claim 2, wherein each record indicates that at least one page of data has not been programmed into the storage unit.

4. The method of claim 1, wherein the step for updating cache information to indicate that the page of data has not been programmed into the storage unit, and to also indicate the location of the DRAM caching the page of data further comprises:
   inserting a record comprising the first address, and a second address of the DRAM caching the data page; and
   updating a bit value of a cache bitmap of the DRAM to indicate that the data page has not been programmed into the storage unit.

5. The method of claim 1, further comprising:
   storing data cached in the DRAM and the data page in a buffer when the block of data to be programmed has been collected;
   directing a second access interface to program the data of the buffer into the storage unit; and
   updating the cache information of the DRAM to indicate that the cached data has been programmed into the storage unit.

6. The method of claim 5, wherein the step for updating the cache information of the DRAM to indicate that the cached data has been programmed into the storage unit further comprises:
   deleting a record comprising information indicating which location of the DRAM the programmed data is cached in.

7. The method of claim 5, wherein the step for updating the cache information of the DRAM to indicate that the cached data has been programmed into the storage unit further comprises:
   deleting a record comprising information indicating which location of the DRAM the programmed data is cached in; and updating a bit value of a cache bitmap of the DRAM to indicate that the cached data has been programmed into the storage unit.

8. The method of claim 1, further comprising:
receiving a data command for reading data of a third address from the storage unit via the first access interface;
determining whether the data of the third address has been programmed into the storage unit; and
reading the data of the third address from the DRAM and directing the first access interface to clock out the read data to the master device when the data of the third address has not been programmed into the storage unit.

9. The method of claim 8, further comprising:
directing a second access interface to read the data of the third address from the storage unit and directing the first access interface to clock out the read data to the master device when the data of the third address has been programmed into the storage unit.

10. An apparatus for caching and reading data to be programmed into a storage unit, comprising:
a first access interface, coupled to a master device; and
a processing unit, coupled to the first access interface, receiving a write command for programming at least a data page into a first address from the master device via the first access interface; determining whether a block of data to be programmed has been collected, wherein the block contains a specified number of pages; and storing the data page in a DRAM (Dynamic Random Access Memory) and updating cache information to indicate that the data page has not been programmed into the storage unit, and to also indicate the location of the DRAM caching the data page when the block of data to be programmed has not been collected,
wherein the processing unit further inserts a record comprising the first address, and a second address of the DRAM caching the data page when the block of data to be programmed has not been collected.

11. The apparatus of claim 10, wherein the processing unit determines whether a block of data to be programmed has been collected by inspecting if a specified number of records are present in the DRAM.

12. The apparatus of claim 11, wherein each record indicates that at least one page of data has not been programmed into the storage unit.

13. The apparatus of claim 10, wherein, when the block of data to be programmed has not been collected, the processing unit inserts a record comprising the first address, and a second address of the DRAM caching the data page; and updates a bit value of a cache bitmap of the DRAM to indicate that the data page has not been programmed into the storage unit.

14. The apparatus of claim 10, further comprising:
a second access interface, coupled to the storage unit,
wherein the processing unit is coupled to the second access interface, stores data cached in the DRAM and the data page in a buffer, directs the second access interface to program the data of the buffer into the storage unit and updates the cache information of the DRAM to indicate that the cached data has been programmed into the storage unit when the block of data to be programmed has been collected.

15. The apparatus of claim 14, wherein the processing unit deletes a record comprising information indicating which location of the DRAM the programmed data is cached in when the block of data to be programmed has been collected.

16. The apparatus of claim 14, wherein the processing unit deletes a record comprising information indicating which location of the DRAM the programmed data is cached in and updates a bit value of a cache bitmap of the DRAM to indicate that the cached data has been programmed into the storage unit when the block of data to be programmed has been collected.

17. The apparatus of claim 10, wherein the processing unit receives a data command for reading data of a third address from the storage unit via the first access interface; determines whether the data of the third address has been programmed into the storage unit; reads the data of the third address from the DRAM; and directs the first access interface to clock out the read data to the master device when the data of the third address has not been programmed into the storage unit.

18. The apparatus of claim 17, further comprising:
a second interface, coupled to the storage unit,
wherein the processing unit is coupled to the second access interface, and the processing unit directs the second access interface to read the data of the third address from the storage unit and directs the first access interface to clock out the read data to the master device when the data of the third address has been programmed into the storage unit.

* * * * *